US 7,731,209 B2

(12) United States Patent
Nemoto et al.

(10) Patent No.: US 7,731,209 B2
(45) Date of Patent: Jun. 8, 2010

(54) TRACTOR

(75) Inventors: Syuusuke Nemoto, Osaka (JP); Yozo Oka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 381 days.

(21) Appl. No.: 11/793,405

(22) PCT Filed: Sep. 30, 2005

(86) PCT No.: PCT/JP2005/018189

§ 371 (c)(1),
(2), (4) Date: Jun. 15, 2007

(87) PCT Pub. No.: WO2006/077680

PCT Pub. Date: Jul. 27, 2006

(65) Prior Publication Data

US 2008/0135324 A1    Jun. 12, 2008

(30) Foreign Application Priority Data

Jan. 21, 2005   (JP)   ............................. 2005-014726

(51) Int. Cl.
*B62D 13/04* (2006.01)
*B62D 7/18* (2006.01)
(52) U.S. Cl. .................................... 280/98; 280/93.502
(58) Field of Classification Search .................. 280/98, 280/103, 93.504, 93.521; 180/371
See application file for complete search history.

(56) References Cited

U.S. PATENT DOCUMENTS

| 1,427,513 A | * | 8/1922 | Byron | 280/103 |
| 2,302,570 A | * | 11/1942 | Peterson | 180/340 |
| 2,776,019 A | * | 1/1957 | Keese | 180/339 |
| 2,949,040 A | * | 8/1960 | Bixby | 74/390 |
| 3,051,063 A | * | 8/1962 | Roberts | 404/125 |
| 3,150,531 A | * | 9/1964 | Singer | 74/390 |
| 3,311,387 A | * | 3/1967 | Klemm et al. | 280/103 |
| 3,370,670 A | * | 2/1968 | Love | 180/233 |
| 4,586,722 A | * | 5/1986 | Watanabe et al. | 280/103 |
| 4,941,543 A | * | 7/1990 | Ewen | 180/254 |

(Continued)

FOREIGN PATENT DOCUMENTS

FR            2 814 115            3/2002

(Continued)

*Primary Examiner*—Paul N Dickson
*Assistant Examiner*—Nicole Verley
(74) *Attorney, Agent, or Firm*—Jordan and Hamburg LLP

(57) ABSTRACT

The present invention realizes a common use of left and right gear casings aims thus reducing a manufacturing cost by an amount corresponding to the common use of the left and right gear casings. According to the present invention, in a tractor in which a front axle case which extends in the lateral direction is mounted on a body frame, and a pair of left and right front wheels are respectively mounted on left and right end portions of the front axle case by way of left and right gear casings, the front axle case is constituted of a center casing forming body and left and right casing forming bodies which have respective proximal end portions thereof connected to left and right end portions of the center casing forming body, and proximal end portions of the left and right casing forming bodies have mounting positions thereof arranged adjustable about axes with respect to the left and right end portions of the center casing forming body.

2 Claims, 12 Drawing Sheets

U.S. PATENT DOCUMENTS

| | | | |
|---|---|---|---|
| 5,046,577 A * | 9/1991 | Hurlburt | 180/266 |
| 5,129,477 A * | 7/1992 | Hurlburt | 180/265 |
| 5,312,123 A * | 5/1994 | Hurlburt | 280/93.503 |
| 5,340,138 A * | 8/1994 | Hurlburt | 280/93.504 |
| 5,476,276 A * | 12/1995 | Hurlburt | 280/137.5 |
| 6,039,143 A * | 3/2000 | Kielar et al. | 180/412 |
| 6,056,081 A * | 5/2000 | Hatlen et al. | 180/346 |
| 6,202,781 B1 * | 3/2001 | Ima | 180/252 |
| 6,675,925 B2 * | 1/2004 | Takahashi et al. | 180/266 |
| 6,733,019 B2 * | 5/2004 | Diener et al. | 280/93.51 |
| 7,290,637 B2 * | 11/2007 | Nagata et al. | 180/439 |
| 2004/0262070 A1 | 12/2004 | Uemura et al. | |
| 2005/0082780 A1 * | 4/2005 | Seeds et al. | 280/93.512 |
| 2005/0110235 A1 * | 5/2005 | LeBlanc et al. | 280/124.135 |

FOREIGN PATENT DOCUMENTS

| | | |
|---|---|---|
| JP | 58-111626 | 7/1983 |
| JP | 62-111221 | 7/1987 |
| JP | 1-218909 | 9/1989 |
| JP | 3-182880 | 8/1991 |
| JP | 6-511 | 1/1994 |
| JP | 7-257414 | 10/1995 |
| JP | 2002-248957 | 9/2002 |
| JP | 2005-14772 | 1/2005 |

* cited by examiner

TRACTOR

BACKGROUND OF THE INVENTION

The present invention relates to the structure of a front axle case of a tractor.

Conventionally, as one mode of a tractor, there has been known a tractor in which a front axle case which extends in the lateral direction is mounted on a body frame, and a pair of left and right front wheels are respectively mounted on left and right end portions of the front axle case by way of left and right gear casings (see patent literature 1, for example).

Further, the front axle case is constituted of a left casing forming body and right casing forming body, wherein the left casing forming body has a proximal end portion (an inner end portion) thereof bulged in the radial direction to form a front differential device housing portion, and the proximal end portion and a proximal end portion (an inner end portion) of the right casing forming body are connected with each other.

Further, the left and right gear casings are mounted on distal end portions (outer end portions) of the left and right casing forming bodies in a state that mounting positions thereof are adjustable about axes of the above-mentioned left and right casing forming bodies by way of taps thus providing a caster angle to the front wheels.

However, in the above-mentioned tractor, the left and right gear casings are mounted on the distal end portions of the respective left and right casing forming bodies in a state that the mounting positions thereof are adjustable by way of the taps to provide the caster angle and hence, it is impossible to mount the right gear case (left gear case) to the distal end portion of the left casing forming body (right casing forming body). Accordingly, it is necessary to prepare the left and right gear casings respectively thus giving rise to a drawback that both of left and right gear casings can not be used in common. As a result, a manufacturing cost is pushed up by an amount corresponding to the necessity to prepare the left and right gear casings respectively.

Patent literature 1: Japanese Accepted Patent Publication Hei6 (1994)-511

SUMMARY OF THE INVENTION (1) According to a first aspect of the present invention, in a tractor in which a front axle case which extends in the lateral direction is mounted on a body frame, and a pair of left and right front wheels are respectively mounted on left and right end portions of the front axle case by way of left and right gear casings, the front axle case is constituted of a center casing forming body and left and right casing forming bodies which have respective proximal end portions thereof connected to left and right end portions of the center casing forming body, and proximal end portions of the left and right casing forming bodies have mounting positions thereof arranged adjustable about axes with respect to the left and right end portions of the center casing forming body.

In this manner, the proximal end portions of the left and right casing forming bodies have the mounting positions thereof arranged adjustable about the axes with respect to the left and right end portions of the center casing forming body and hence, it is no more necessary to mount left and right gear casings on distal end portions of the respective left and right casing forming bodies by way of taps whereby the left and right gear casings can be used in common thus reducing a manufacturing cost by an amount corresponding to the common use of the left and right gear casings.

(2) According to a second aspect of the present invention, cylinder stays are mounted on the left and right casing forming bodies respectively and a power steering cylinder is interposed between both cylinder stays.

In this manner, since the power steering cylinder is interposed between the left and right casing forming bodies by way of the respective cylinder stays, it is possible to ensure the mounting accuracy of the power steering cylinder on making surfaces between the left and right end portions of the center casing forming body and the proximal end portions of respective left and right casing forming bodies whereby an assembling operation of the power steering cylinder can be facilitated.

DETAILED DESCRIPTION OF THE INVENTION

Figure 1:
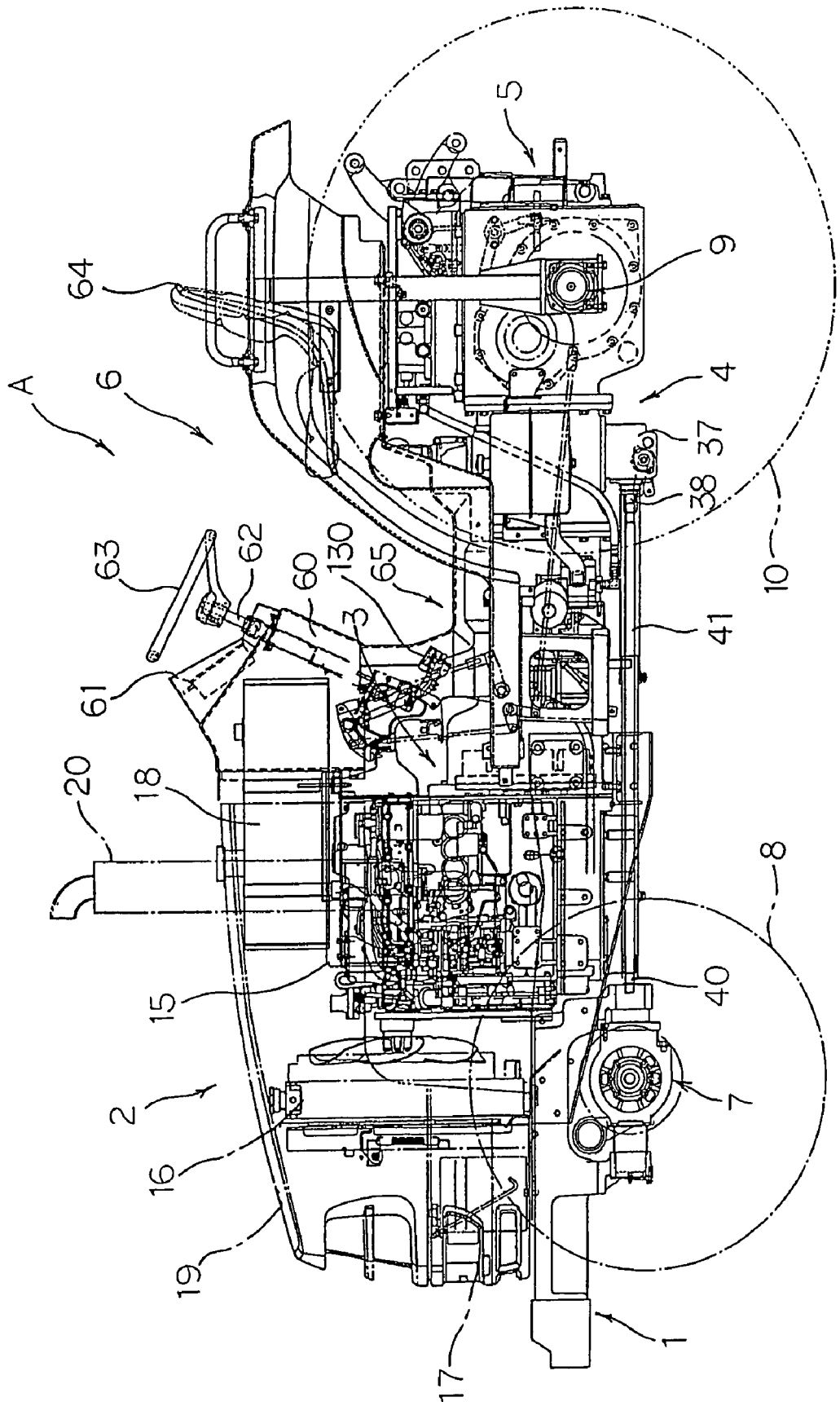
FIG. 1 is an explanatory side view of a tractor according to the present invention.

Symbol A shown in FIG. 1 indicates a tractor according to the present invention. In the tractor A, a prime mover portion 2 is mounted on a body frame 1, a transmission portion 4 is interlockingly connected with the prime mover portion 2 by way of a clutch portion 3, a PTO transmission portion 5 is detachably and interlockingly connected to a rear portion of the transmission portion 4, a driver's portion 6 is arranged above the transmission portion 4, a pair of left and right front wheels 8, 8 are interlockingly connected with the transmission portion 4 by way of a front axle case 7 below the above-mentioned body frame 1, and a pair of left and right rear wheels 10, 10 are interlockingly connected with the above-mentioned transmission portion 4 by way of rear axle casings 9, 9.

In the prime mover portion 2, as shown in FIG. 1, an engine 15 is mounted on the body frame 1, a radiator 16 is arranged at a position immediately in front of the engine 15, a battery 17 is arranged at a position immediately in front of the radiator 16, a fuel tank 18 which is formed in a longitudinally extended manner is arranged at a position immediately above the engine 15, and these parts are covered with a hood 19 which can be opened and closed. Numeral 20 indicates a muffler.

Figure 2:
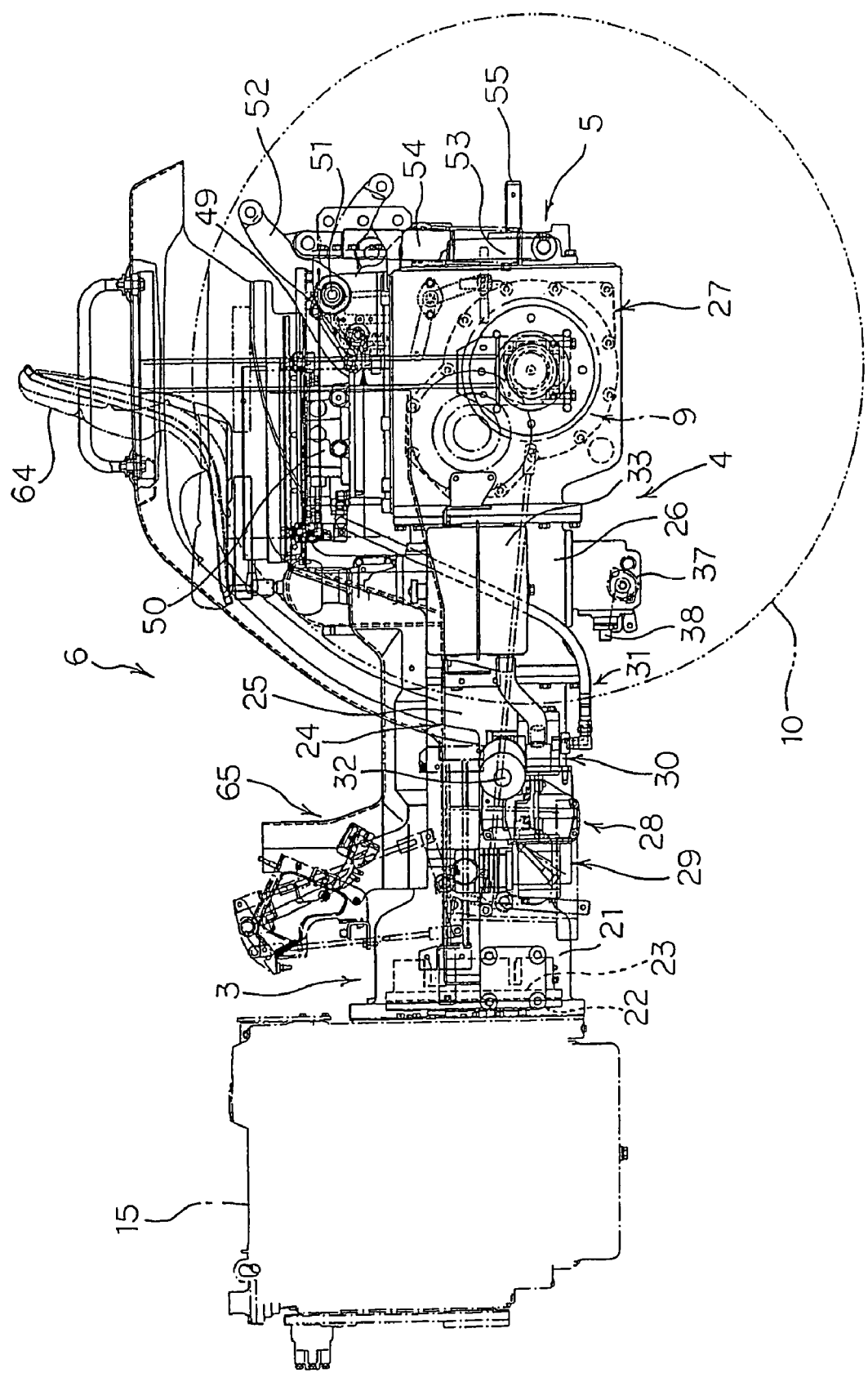
FIG. 2 is an explanatory side view of a rear half portion of the tractor.
Figure 3:
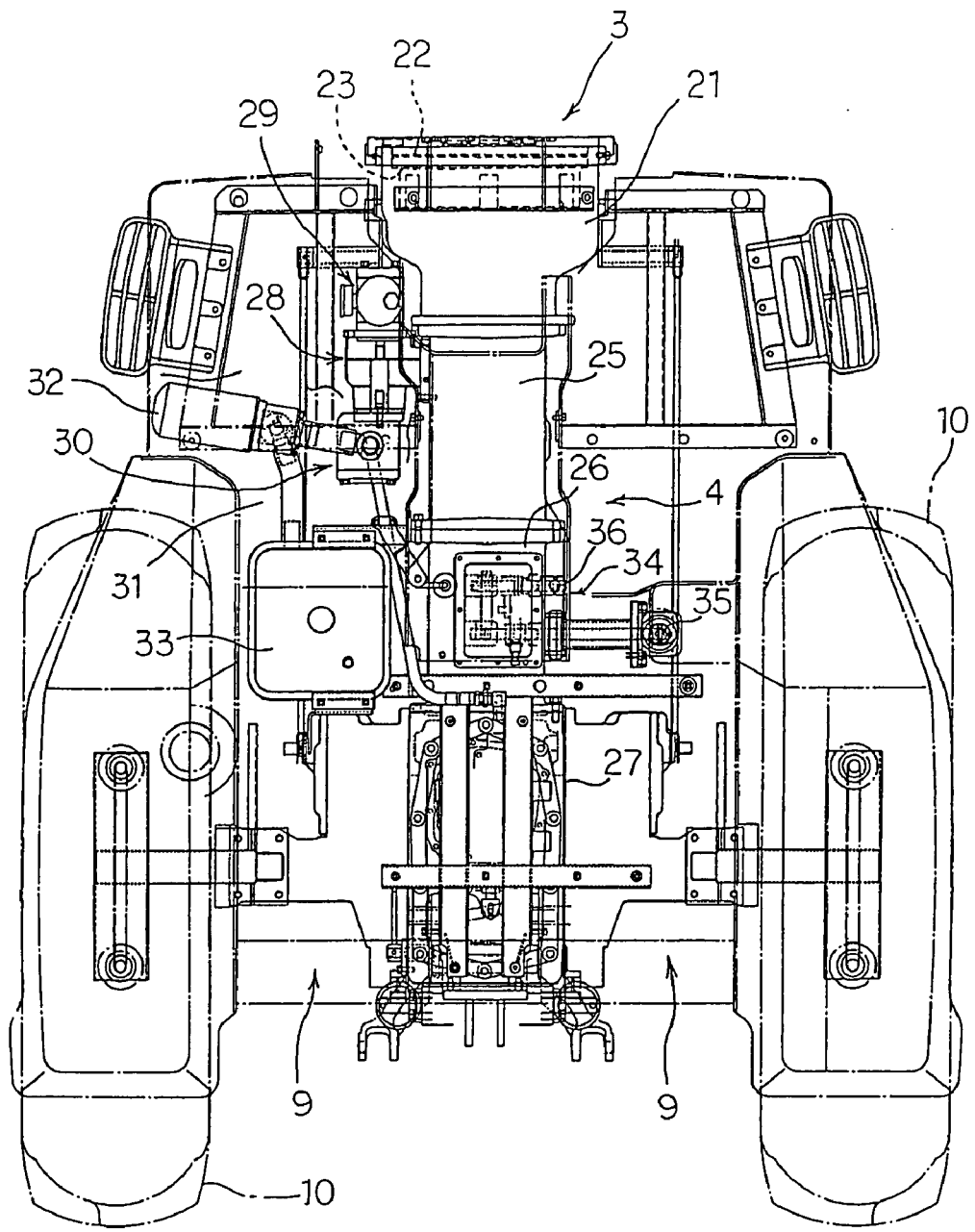
FIG. 3 is an explanatory plan view of the rear half portion of the tractor.

With respect to the clutch portion 3, as shown in FIG. 2 and FIG. 3, a traveling clutch 22 and a PTO clutch 23 are arranged in the inside of a clutch housing 21 in a state that the traveling clutch 22 and the PTO clutch 23 are arranged close to each other coaxially thus constituting a dual clutch mechanism.

The transmission portion 4 is, as shown in FIG. 2 and FIG. 3, incorporated in a transmission case 24 which extends in the longitudinal direction and is formed in a cylindrical shape, wherein the transmission case 24 has the three-split constitution consisting of a main transmission case 25 which incorporates a main transmission mechanism therein, a sub transmission case 26 which incorporates a sub transmission mechanism therein, and a differential case 27 which incorporates a differential mechanism 42 (see FIG. 8) therein.

Further, a power take out portion 28 is mounted on a left front portion of the transmission portion 4, an air compressor 29 is detachably mounted on a front end portion of the power take out portion 28, and a hydraulic pump 30 is detachably mounted on a rear end portion of the power take out portion 28.

Here, as shown in FIG. 2 and FIG. 3, a hydraulic filter 32 and a working oil tank 33 are communicably connected with the hydraulic pump 30 in series by way of a hydraulic pipe 31 and, at the same time, the hydraulic pump 30, the hydraulic filter 32 and the working oil tank 33 are arranged close to each other.

Further, as shown in FIG. 2 and FIG. 3, a lever-proximal-portion case 34 is communicably connected with a ceiling portion of the sub transmission case 26, and respective proximal end portions (lower end portions) of a main transmission lever 35 and a sub transmission lever 36 are interlockingly connected with a lever interlocking mechanism (not shown in the drawing) provided in the inside of the lever-proximal-portion case 34.

Further, as shown in FIG. 1 and FIG. 2, a front wheel driving power takeout case 37 is communicably connected with a bottom portion of the sub transmission case 26, an output shaft 38 is projected frontward from a front wheel power takeout mechanism (not shown in the drawing) which is incorporated in the front wheel driving power takeout case 37, an input shaft (see FIG. 5) is projected rearward from a front wheel driving mechanism 39 (see FIG. 4) provided in the inside of the above-mentioned front axle case 7, and a power transmission shaft 41 (see FIG. 1) which extends in the longitudinal direction is interposed between both shafts 38, 40.

Figure 8:
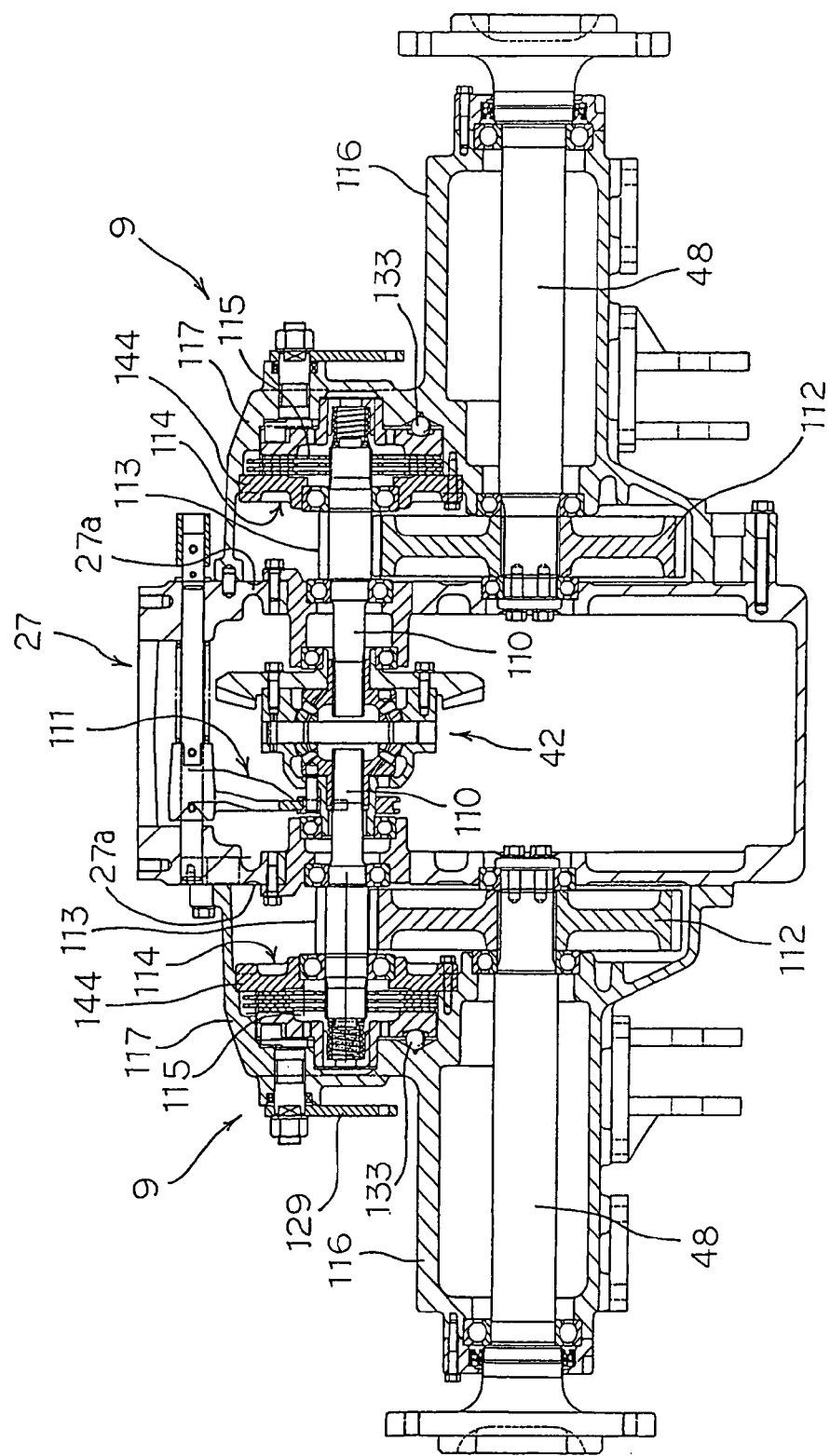
FIG. 8 is an explanatory side view of a differential case and a rear axle case.

As shown in FIG. 8, a differential mechanism 42 is provided in the inside of the differential case 27, proximal end portions (inner end portions) of a pair of left and right output shafts 110, 110 which have axes thereof directed in the lateral direction are interlockingly connected with the differential mechanism 42, and distal end portions (outer end portions) of the respective output shafts 110, 110 are projected outward from left and right side walls 27a, 27a of the differential case 27. Numeral 111 indicates a differential locking manipulation mechanism which is served for performing a differential locking manipulation of the differential mechanism 42, wherein a differential locking pedal (not shown in the drawing) which is arranged in the driver's portion 6 is interlockingly connected with the differential locking manipulation mechanism 111.

Further, as shown in FIG. 2, a lift arm support body 49 is detachably mounted on a ceiling portion of the differential case 27, a hydraulic circuit body 50 is detachably mounted on a front portion of the lift arm support body 49, proximal end portions of a pair left and right lift arms 52, 52 are mounted on a rear portion of the lift arm support body 49 by way of a lift arm support shaft 51, and lift cylinders 54, 54 which extend and retract in the vertical direction are arranged between the middle portion of the respective lift arms 52, 52 and lower portions of left and right side walls of a PTO transmission case 53 described later.

In the PTO transmission portion 5, as shown in FIG. 2, the PTO transmission case 53 is interlockingly connected with a rear wall portion of the differential case 27 of the above-mentioned transmission portion 4, a PTO transmission mechanism (not shown in the drawing) which constitutes a portion of the above-mentioned PTO-system power transmission mechanism is provided in the inside of the PTO transmission case 53, and a PTO shaft 55 which forms a terminal portion (a rear end portion) of the PTO transmission mechanism is projected rearward.

In the driver's portion 6, as shown in FIG. 1, a dashboard 60 which closes a rear-end opening portion of the hood 19 mounted on the prime mover portion 2 is provided in an rejected manner, a meter panel 61 is mounted on an upper end portion of the dashboard 60, a steering wheel support shaft 62 is projected upward from the meter panel 61, a steering wheel 63 is mounted on an upper end portion of the steering wheel support shaft 62, and a driver's seat 64 is arranged at a position behind the steering wheel 63 and, at the same time, at a position immediately above the transmission portion 4.

Further, as shown in FIG. 1 to FIG. 3, a cover body 65 is extended over the driver's portion 6, the transmission portion 4 and the left and right rear wheels 10, 10, wherein the cover body 65 forms a step portion of the driver's portion 6 and, at the same time, covers the transmission portion 4 from above.

Figure 4:
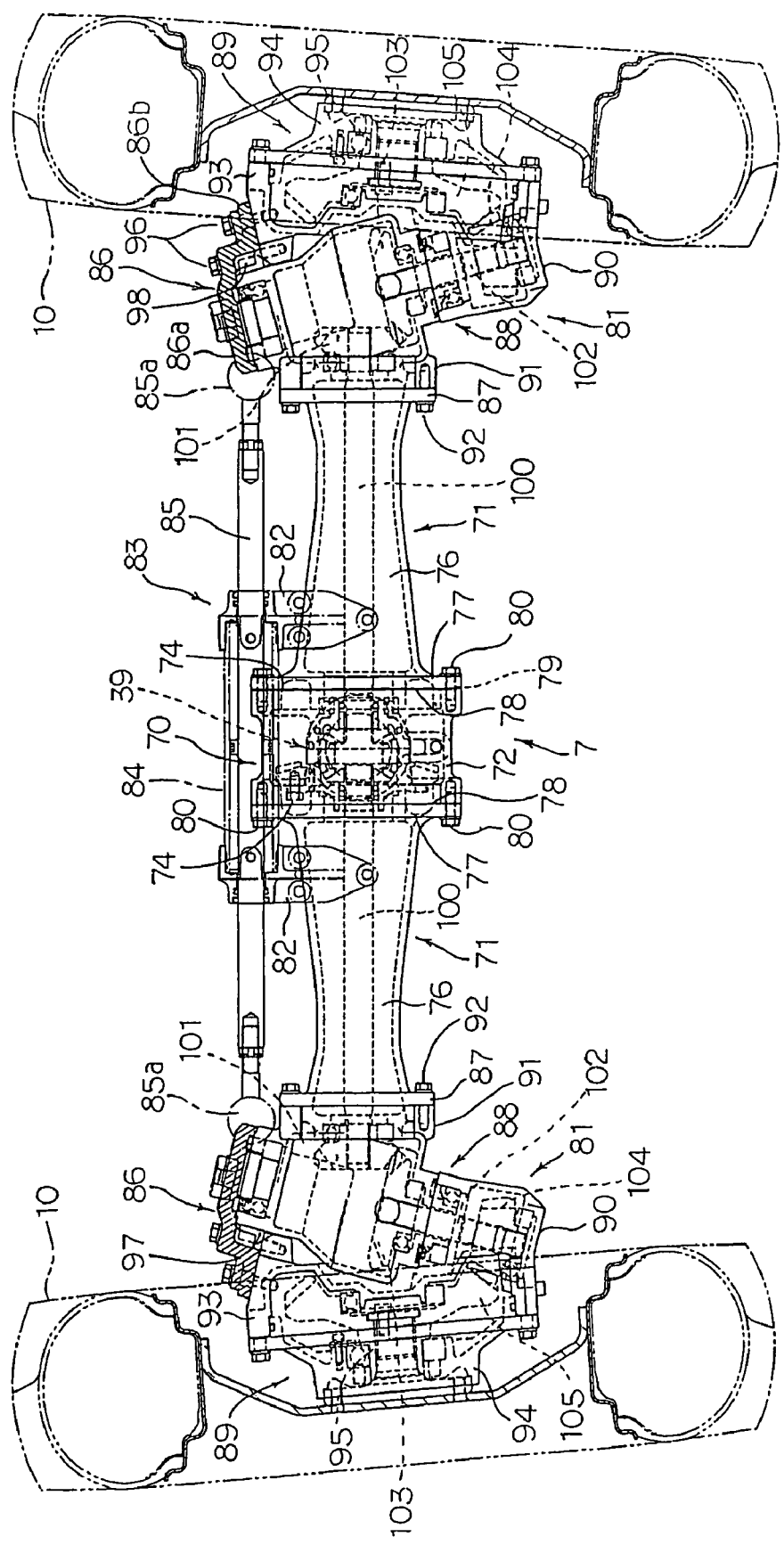
FIG. 4 is an explanatory front view of a front axle case.
Figure 5:
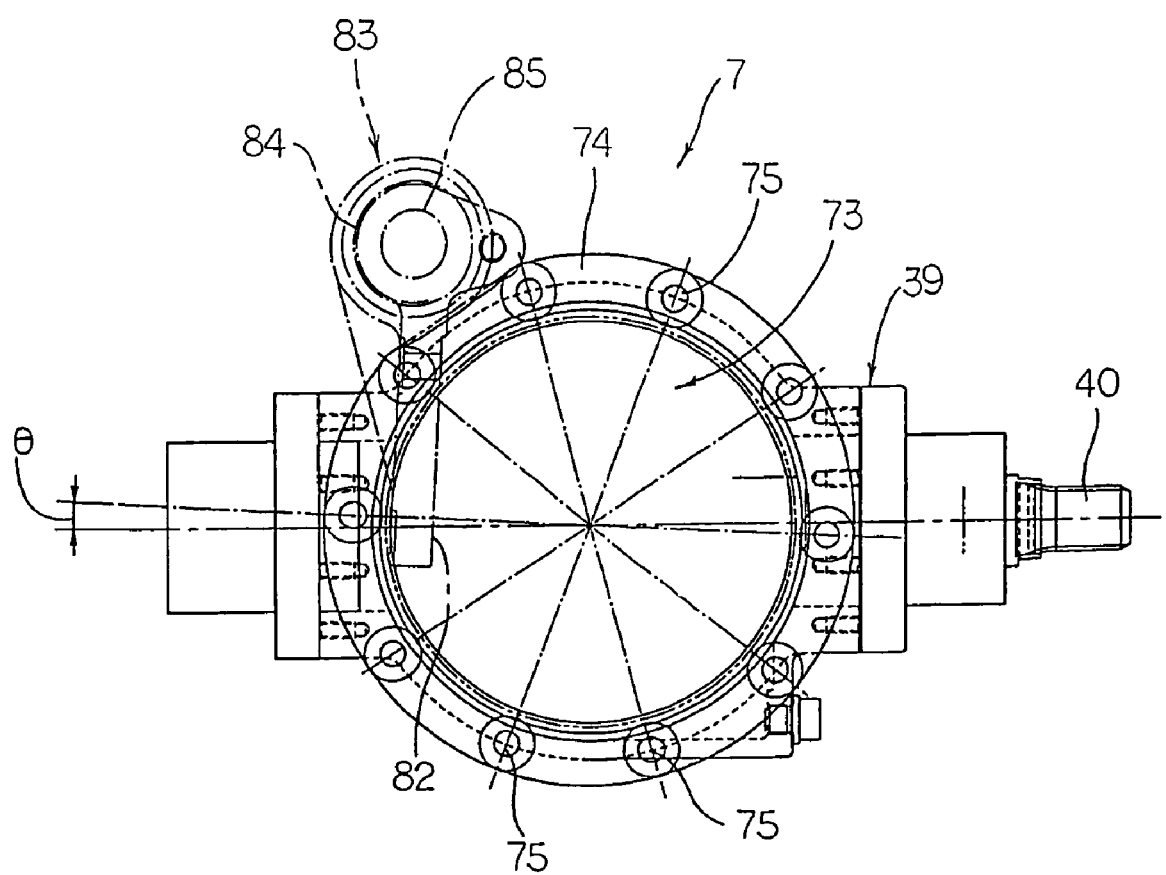
FIG. 5 is an explanatory side view of a center casing forming body of the front axle case.

The front axle case 7 is, as shown in FIG. 4 and FIG. 5, constituted of a center casing forming body 70 and left and right casing forming bodies 71, 71 which have respective proximal end portions thereof connected to left and right end portions of the center casing forming body 70, and the proximal end portions of the left and right casing forming bodies 71, 71 have mounting positions thereof arranged adjustable about axes with respect to the left and right end portions of the center casing forming body 70.

That is, with respect to the center casing forming body 70, communication opening portions 73, 73 having a circular shape respectively are formed on left and right portions of a forming body core 72 which houses the front wheel driving mechanism 39, abutting surfaces 74, 74 are formed on outer end surfaces of the respective communication opening portions 73, 73, and a plurality of (eight in this embodiment) bolt holes 75, 75 which also function as positioning holes are formed in the respective abutting surfaces 74, 74 at a fixed interval in the circumferential direction.

Further, the left and right casing forming bodies 71, 71 are formed in the same shape to be used in common, wherein connecting flange portions 77, 77 are formed on proximal end portions (inner end portions) of cylindrical forming body cores 76, 76 which extend in the lateral direction, abutting surfaces 78, 78 are formed on outer end surfaces of the respective connecting flange portions 77, 77, and a plurality of (eight in this embodiment) bolt insertion holes 79, 79 which are aligned with the above-mentioned bolt holes 75, 75 are formed on peripheral portions of the respective connecting flange portions 77, 77.

Due to such a constitution, the abutting surfaces 78, 78 of the left and right casing forming bodies 71, 71 are brought into face contact with the respective abutting surfaces, 74, 74 of the center casing forming body 70 in an abutting state and, at the same time, the bolt holes 75, 75 and the bolt insertion holes 79, 79 are aligned with each other, and connecting bolts 80 are threadedly engaged in both holes 75, 79 whereby the left and right casing forming bodies 71, 71 are connected to the center casing forming body 70 thus constituting the front axle case 70.

Here, by rotating the left and right casing forming bodies 71, 71 about axes thereof with respect to the bolt holes 75, 75 formed in the respective abutting surfaces 74, 74 of the center casing forming body 70 thus adjusting the mounting positions thereof, it is possible to allow the bolt insertion holes 79 formed in the connecting flange portions 77, 77 of the respective left and right casing forming bodies 71, 71 to be aligned with the bolt holes 75, 75 and, at the same time, as shown in FIG. 5, it is possible to impart a given caster angle θ to the left and right casing forming bodies 71, 71.

In this manner, the proximal end portions of left and right casing forming bodies 71, 71 have the mounting positions thereof arranged adjustable about axes thereof with respect to left and right end portions of the center casing forming body 70 and hence, it is no more necessary to mount left and right gear casings 81, 81 described later to distal end portions of the respective left and right casing forming bodies 71, 71 by way of taps. Accordingly, the left and right gear casings 81, 81 can be used in common and hence, a manufacturing cost can be reduced by an amount corresponding to the common use of the left and right gear casings 81, 81.

Further, as shown in FIG. 4 and FIG. 5, lower end portions of cylinder stays 82, 82 which extend vertically respectively are fixedly mounted on the left and right casing forming bodies 71, 71, while a power steering cylinder 83 which forms a portion of a power steering mechanism (not shown in the drawing) is interposed between both cylinder stays 82, 82.

Here, the above-mentioned power steering mechanism is interlockingly connected with the steering wheel 63 provided to the driver's portion 6, the left and right front wheels 8, 8 are interlockingly connected with the power steering mechanism by way of the left and right gear casings 81, 81 described later thus allowing both front wheels 8, 8 to be steerably manipulated by the steering wheel 63 by way of the power steering mechanism and left and right gear casings 81, 81.

Further, the power steering cylinder 83 includes a cylinder body 84 which extends in the lateral direction and a piston rod 85 which extends in the lateral direction in the cylinder body 84 and also penetrates the cylinder body 84, wherein the piston rod 85 is slidably moved in the lateral direction using a hydraulic pressure, and left and right end portions 85a, 85a of the piston rod 85 are interlockingly connected with knuckle arms 86, 86 described later.

In this manner, since the power steering cylinder 83 is interposed between the left and right casing forming bodies 71, 71 by way of the respective cylinder stays 82, 82, it is possible to ensure the mounting accuracy of the power steering cylinder 83 on the respective abutting surfaces 74, 74, 78, 78 between the left and right end portions of the center casing forming body 70 and the proximal end portion of the respective left and right casing forming bodies 71, 71 whereby an assembling operation of the power steering cylinder 83 can be facilitated.

Further, connecting flange portions 87, 87 are also formed on distal end portions (outer end portions) of the left and right casing forming bodies 71, 71 having the above-mentioned constitution, the left and right gear casings 81, 81 are connected to the respective connecting flange portions 87, 87 and the respective front wheels 8, 8 are mounted on the respective left and right gear casings 81, 81.

That is, the left and right gear casings 81, 81 are constituted of fixed-side casing forming bodies 88, 88 and rotation-side casing forming bodies 89, 89, wherein the fixed-side casing forming bodies 88, 88 have connecting flange portions 91, 91 thereof contiguously formed on inner walls of forming body cores 90, 90 which extend vertically, and the respective connecting flanges 91, 91 are connected and fixed to the connecting flange portions 87, 87 formed on the distal end portions (outer end portions) of the left and right casing forming bodies 71, 71 using connecting bolts 92, 92.

Further, the rotation-side casing forming bodies 89, 89 have connecting boss portions 94, 94 thereof contiguously formed on outer walls of forming body cores 93, 93 which extend vertically, and front axles 95, 95 of the front wheels 8, 8 are pivotally supported on and connected to the respective connecting boss portions 94, 94.

Figure 6:
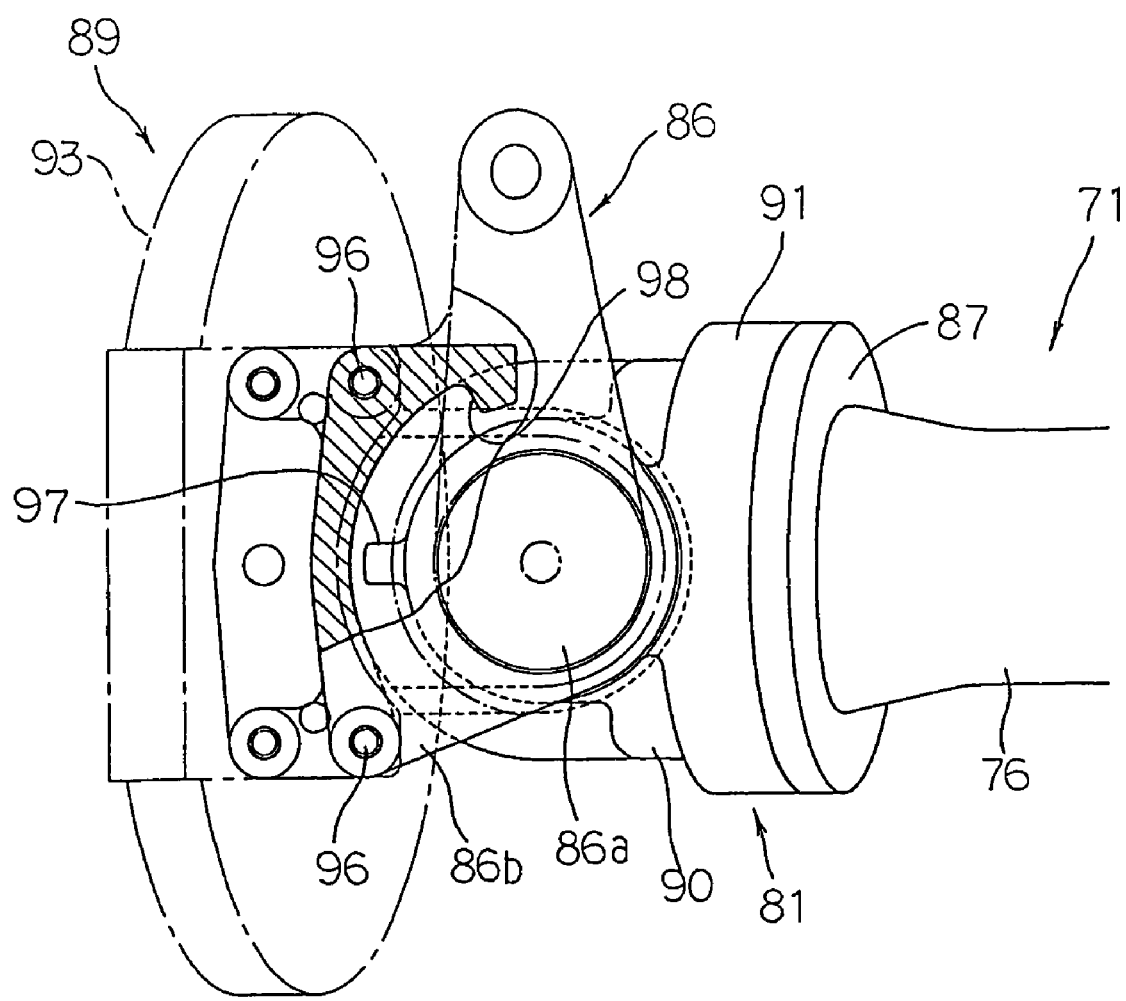
FIG. 6 is an explanatory plan view with a part broken away of a left gear case.

Further, also as shown in FIG. 6, proximal end portions (rear end portions) 86a, 86a of the knuckle arms 86, 86 which extend in the longitudinal direction are rotatably and pivotally connected to upper end portions of the forming body cores 90, 90 of the fixed-side casing forming bodies 88, 88 about axes thereof in the vertical direction, connecting members 86b, 86b extend toward upper end portions of the forming body cores 93, 93 of the rotation-side casing forming bodies 89, 89 from the respective proximal end portions 86a, 86a, distal end portions of the respective connecting members 86b, 86b are connected to upper end portions of the forming body cores 93, 93 using connecting bolts 96, 96, and lower end portions of the fixed-side casing forming bodies 88, 88 and lower end portions of the respective forming body cores 90, 90, 93, 93 of the rotation-side casing forming bodies 89, 89 are pivotally connected with each other.

In this manner, the rotation-side casing forming bodies 89, 89 are rotatably mounted on the fixed-side casing forming bodies 88, 88 about axes thereof in the vertical direction by way of the knuckle arms 86, 86.

Figure 7:
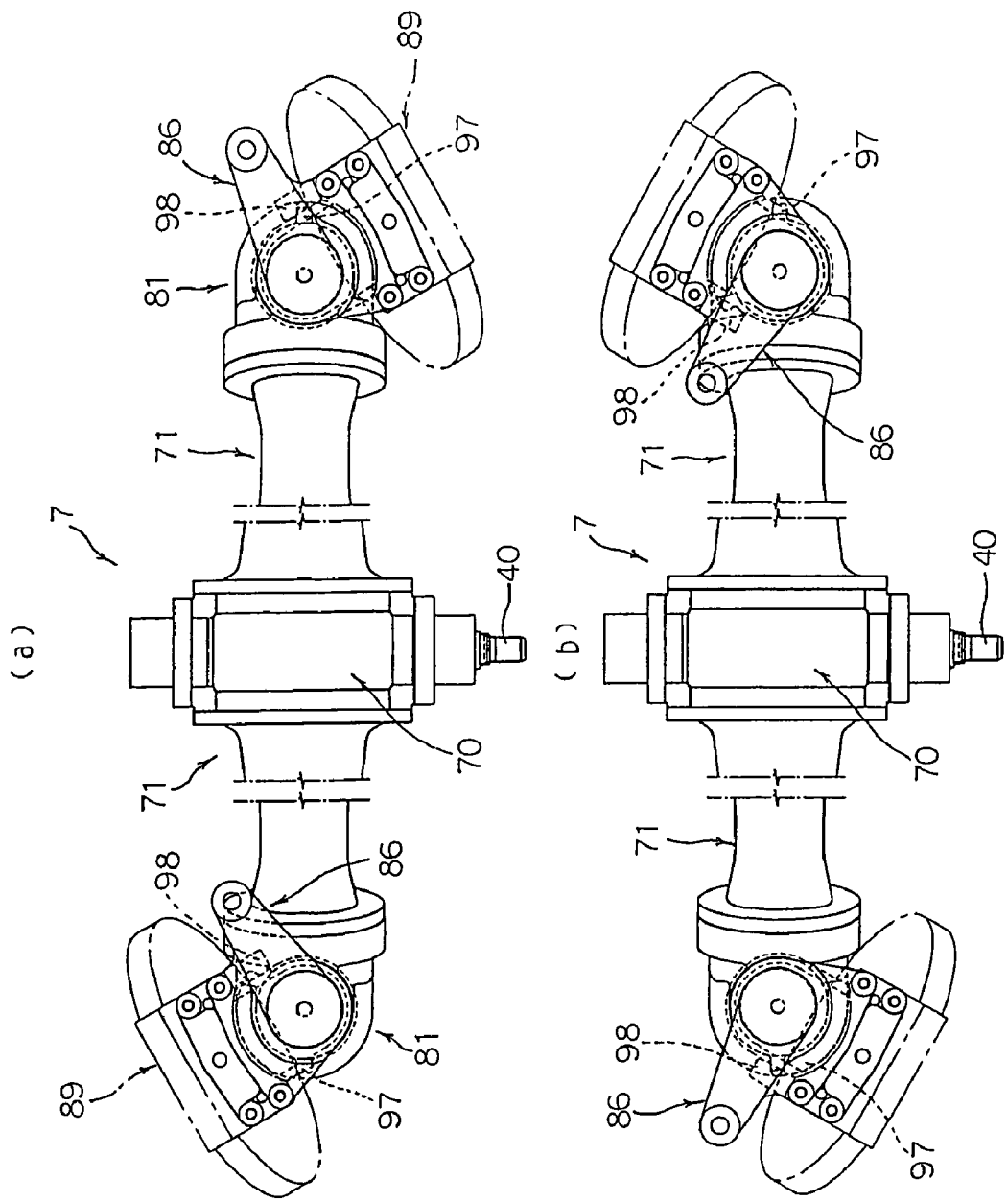
FIG. 7 is an operation explanatory view of left and right rotation-side gear casing forming body.

Further, as shown in FIG. 6 and FIG. 7, rotation restricting members 97, 97 are mounted on center portions of outer peripheral surfaces of the forming body cores 90, 90 of the fixed-side casing forming bodies 88, 88 in a state that the rotation restricting members 97, 97 project outward toward the rotation-side casing forming bodies 89, 89 side, while driven rotation restricting members 98, 98 are mounted on front portions of lower surfaces of connecting members 86b, 86b of the knuckle arms 86, 86 in a state that the driven rotation restricting members 98, 98 project inward toward the fixed-side casing forming bodies 88, 88 side.

In this manner, the driven rotation restricting members 98, 98 are integrally rotated with the rotation-side casing forming bodies 89, 89, and are engaged with the above-mentioned rotation restricting members 97, 97 thus restricting the rotation of the rotation-side casing forming bodies 89, 89 by way of the knuckle arms 86, 86.

Accordingly, even when the knuckle arms 86, 86 and the rotation-side casing forming bodies 89, 89 are connected using connecting bolts 96, 96, it is possible to prevent a sheering force exceeding an allowable value from being directly applied to the connecting bolts 96, 96.

As a result, it is possible to prevent the sheering of the above-mentioned connecting bolts 96, 96 thus favorably ensuring the steering and manipulating property.

Further, the rotation restricting members 97, 97 are mounted only portions of center portions on outer peripheral surfaces of the forming body cores 90, 90 of the fixed-side casing forming bodies 88, 88 in a plan view and hence, as shown in FIG. 7(a), when the steering wheel 63 is steerably manipulated in the right direction at the maximum, the driven rotation restricting member 98 mounted on the right rotation-side casing forming body 89 is engaged with the rotation restricting member 97 mounted on the right fixed-side casing forming body 88 thus restricting the rotation of the rotation-side casing forming bodies 89, 89, while as shown in FIG. 7(b), when the steering wheel 63 is steerably manipulated in the left direction at the maximum, the driven rotation restricting member 98 mounted on the left rotation-side casing forming body 89 is engaged with the rotation restricting member 97 mounted on the left fixed-side casing forming body 88 thus restricting the rotation of the rotation-side casing forming bodies 89, 89.

As a result, the left and right gear casings 81, 81 can be used in common thus enabling the reduction of a manufacturing cost.

Further, in FIG. 4, numeral 100 indicates a front-wheel drive shaft, numeral 101 indicates a driving bevel gear, numeral 102 indicate an intermediate longitudinal shaft, numeral 103 indicates an input-side bevel gear, numeral 104 indicates an output-side bevel gear, and numeral 105 indicates a front-axle inputting bevel gear.

Figure 9:
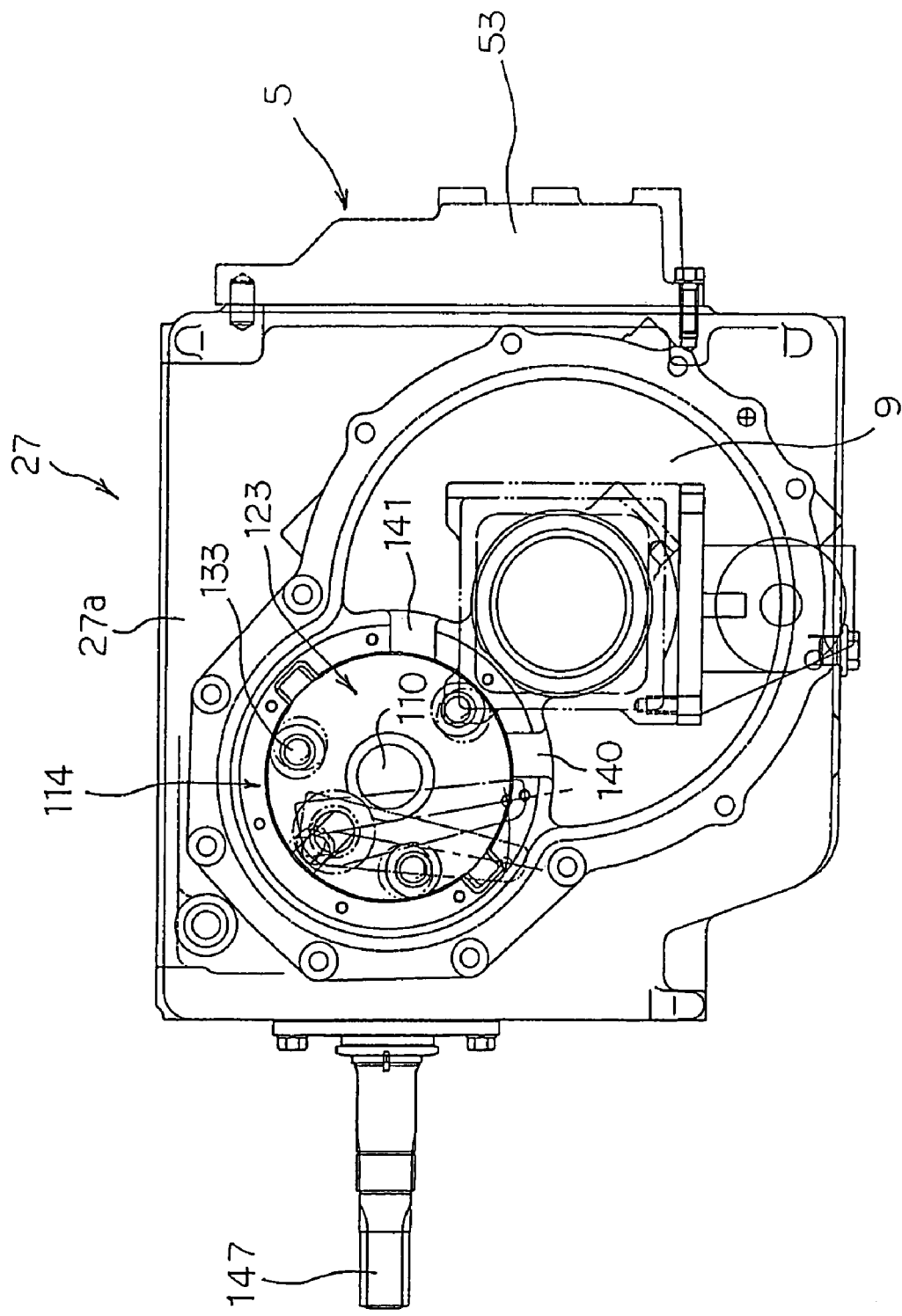
FIG. 9 is an explanatory cross-sectional back view of the differential case and the rear axle case.

As shown in FIG. 8 and FIG. 9, the rear axle casings 9, 9 are constituted of cylindrical case bodies 116, 116 which extend in the lateral direction and casing bodies 117, 117 which are integrally formed on the front upper portion of the respective case bodies 116, 116 and are mounted on the left and right walls 27a, 27a of the differential case 27. Numeral 147 indicates an input shaft.

Further, rear axles 48, 48 are inserted in the respective case bodies 116, 116 and, at the same time, the respective rear axles 48, 48 are rotatably supported on the respective case bodies 116, 116. On the other hand, input gears 112, 112 are mounted on the proximal portions of the rear axles 48, 48, output gears 113, 113 are mounted on middle portions of the above-mentioned output shafts 110, 110 and input gears are meshed with the respective output gears 113, 113.

Further, in the inside of the respective casing bodies 117, multiple-disc brake devices 114, 114 are interlockingly mounted. Hereinafter, the constitution of the brake device 114 is explained in conjunction with FIG. 8 to FIG. 11.

That is, with respect to the brake device 114, as shown in FIG. 8 to FIG. 12, a plurality (three in this embodiment) of rotation-side discs 115 which are integrally rotated with the output shaft 110 are mounted on an outer peripheral surface of a distal end portion (outer end portion) of the output shaft 110.

Figure 12:
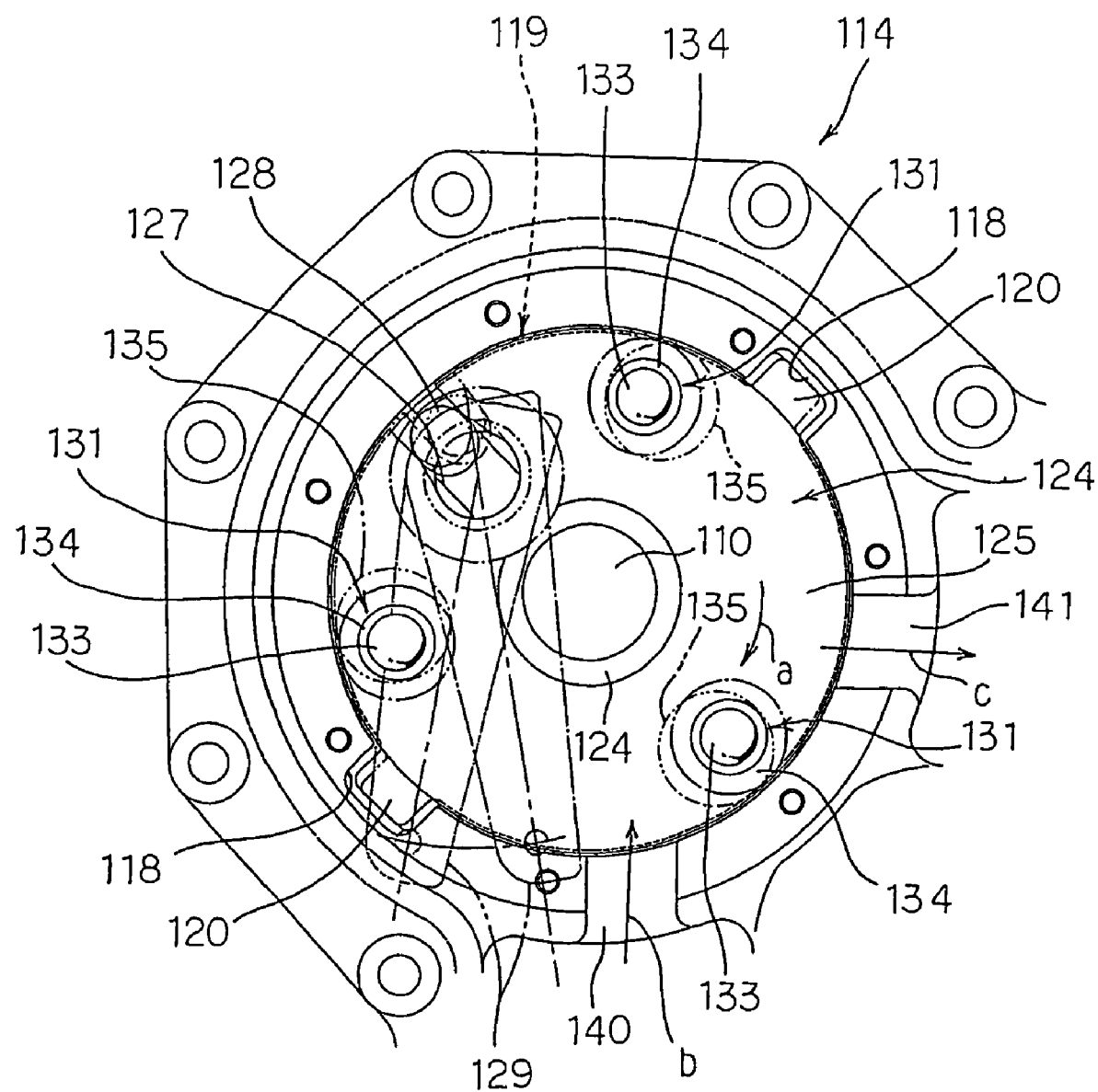
FIG. 12 is an explanatory side view of the brake device.

Further, as shown in FIG. 12, in an inner surface of the casing body 117 which covers the rotation-side disc 115, a plurality (two in this embodiment) of engaging recessed portions 118, 118 are arranged at positions which are in a point symmetry with respect to the output shaft 110, a plurality (two in this embodiment) of engaging members 120, 120 are respectively mounted in a projecting manner on a peripheral portion of each one of a plurality (three in this embodiment) of fixed-side discs 119 which are formed in a ring-like shape at positions which are in a point symmetry with respect to the output shaft 110. By allowing the respective engaging members 120, 120 to be fitted and meshed with the above-mentioned engaging recessed portions 118, 118, the respective fixed-side discs 119 are positioned and are supported on the casing body 117 whereby the respective fixed-side discs 119 are arranged around the output shaft 110 in a fixed state.

Further, on the outer side of the rotation-side discs 115, a pivotally supporting recessed portion 122 is formed in a portion of a side wall 121 of the casing body 117 which is positioned coaxially with the above-mentioned output shaft 110 and a pushing body 123 is rotatably and pivotally supported on the pivotally supporting recessed portion 122.

That is, the pushing body 123 is constituted of a cylindrical pushing body support shaft 124 which is fitted in the above-mentioned pivotally supporting recessed portion 122 in a state that the pushing body support shaft 124 is rotatable about an axis of the pivotally supporting recessed portion 122 and a disc-like pusher 125 which is integrally formed with an outer peripheral surface of the pushing body support shaft 124.

Further, an engaging recessed portion 126 is mounted in an outer surface of the above-mentioned pusher 125, while an engaging member 128 is mounted on an inner end portion of a rotary manipulation shaft 127 which is pivotally supported on the side wall 121 of the casing body 117 in a penetrating manner in the lateral direction. The engaging member 128 is engaged with the above-mentioned engaging recessed portion 126 and, at the same time, an operation arm 129 is contiguously formed on an outer end portion of the rotary manipulation shaft 127, and a brake pedal 130 (see FIG. 1 and FIG. 2) which is mounted on the above-mentioned driver's portion 6 is interlockingly connected to the operation arm 129.

Figure 10:
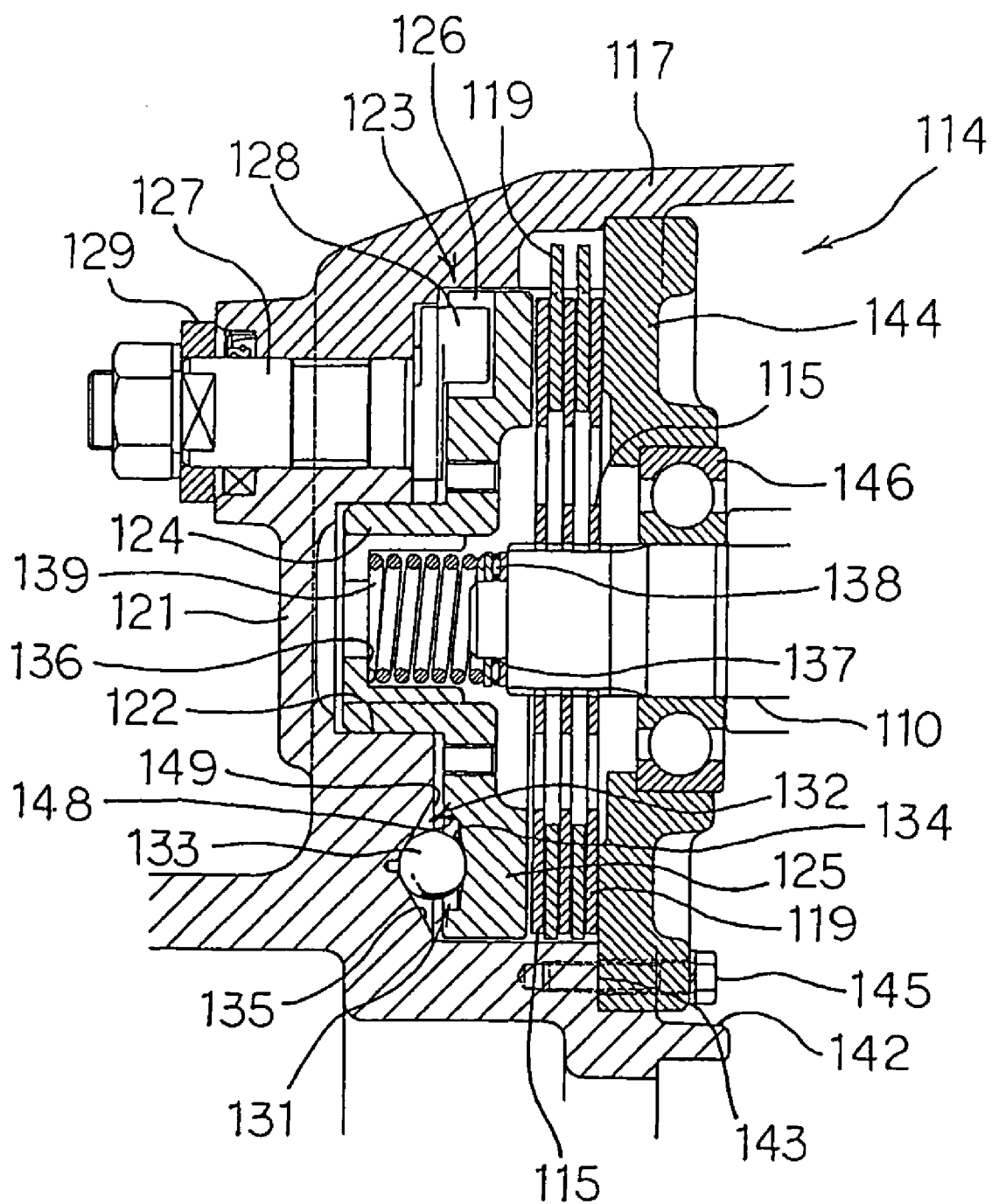
FIG. 10 is a cross-sectional back view of a brake device.
Figure 11:
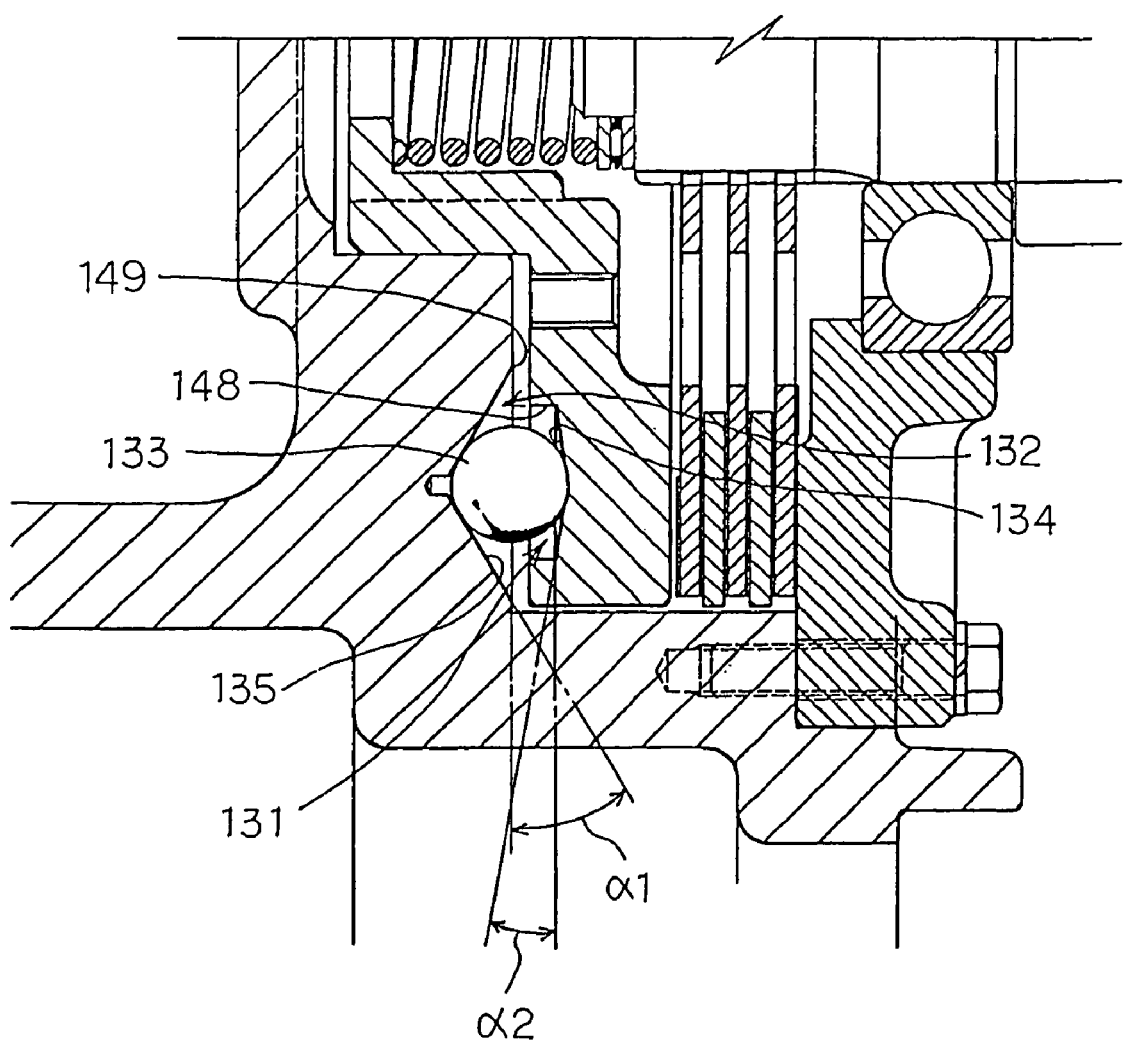
FIG. 11 is a partially enlarged cross-sectional back view of the brake device.

Further, as shown in FIG. 10 to FIG. 12, in a peripheral portion of an outer surface of the above-mentioned pusher 125, a plurality (three in this embodiment) of rotation-side cam ball guiding grooves 131 are formed in a circumferentially equally spaced-apart manner.

On the other hand, fixed-side cam ball guiding grooves 132 are formed in an inner surface of the side wall 121 of the casing body 117 which constitutes a fixed-side portion in a state that the fixed-side cam ball guiding grooves 132 face the above-mentioned respective rotation-side cam ball guiding grooves 131, and cam balls 133 are respectively interposed in an engageable manner between the respective fixed-side cam ball guiding grooves 132 and the above-mentioned respective rotation-side cam ball guiding grooves 131.

Further, on the inner side of the rotation-side disc 115, a receiver-mounting stepped portion 143 is formed on a portion of an inner peripheral wall 142 of the casing body 117 which is positioned coaxially with the above-mentioned output shaft 110, a peripheral portion of a disc receiver 144 which is formed in a donut plate shape is fixed to the receiver-mounting stepped portion 143 using fixing bolts 145, and the disc receiver 144 is arranged to face the pushing body 123 in an opposed manner with the respective discs 115, 119 therebetween. Numeral 146 indicates a bearing.

In this manner, when a step-in manipulation of the brake pedal 130 is performed, the rotary manipulation shaft 127 is rotated in the clockwise direction in a side view shown in FIG. 12 by way of the operation arm 129 and the engaging member 128 rotates the pushing body 123 in the clockwise direction by way of the engaging recessed portion 126.

Further, the pushing body 123 is rotated coaxially with the output shaft 110 and hence, the pushing body 123 is interlockingly operated with the cam balls 133 which are moved in the circumferential direction along the fixed-side cam ball guiding grooves 132 and the rotation-side cam ball guiding grooves 131 whereby, the pushing body 123 is moved in the thrust direction in which the pushing body 123 pushes both of the rotation-side disc 115 and the fixed-side disc 119 to the disc receiver 144 side.

As a result, the rotation-side disc 115 and the fixed-side disc 119 are brought into face contact with the disc receiver 144 in a pressed state thus applying the braking to the rotation of the output shaft 110.

Further, as shown in FIG. 11, while the fixed-side cam ball guiding groove 132 forms a conical recessed portion having a tapered surface 135, the rotation-side cam ball guiding groove 131 forms a bowl-shaped recessed portion having a tapered surface 134 and, at the same time, is provided with a restricting portion 148 which restricts the movement of the cam ball 133 on the tapered surface 134. An inclination angle α1 of the tapered surface 135 of the fixed-side cam ball guiding groove 132 is set to be larger than an inclination angle α2 of the tapered surface 134 of the rotation-side cam ball guiding groove 131.

Here, in the rotation-side cam ball guiding groove 131 which forms the bowl-shaped recessed portion, a conical-shaped tapered surface 134 is formed on a bottom portion thereof and a cylindrical surface is formed contiguously with a peripheral portion of the tapered surface 134, wherein the cylindrical surface defines a restricting portion 148.

Further, the above-mentioned restricting portion 148 is arranged at a position slightly inside than an outer peripheral portion 149 of the tapered surface 135 of the fixed-side cam ball guiding groove 132.

Accordingly, when the pushing body 123 is rotated coaxially with the output shaft 110, the cam balls 133 are guided and moved between the tapered surfaces 134, 135 which are formed on both of the guiding grooves 131, 132 in an opposite state in the direction in which a distance between both of the tapered surfaces 134, 135 becomes small Further, when the movement of the cam balls 133 on the tapered surfaces 134 is restricted due to the restricting portions 148 which are provided to the rotation-side cam ball guiding grooves 131, the cam balls 133 are pushed to the tapered surface 135 of the fixed-side cam ball guiding grooves 132 thus generating a wedge effect.

As a result, the pushing body 123 is moved in the thrust direction and the pushing body 123 pushes both discs 115, 119 and hence, the brake control is surely performed.

Here, provided is the only constitution in which the fixed-side cam ball guiding groove 132 forms the conical recessed portion, and the rotation-side cam ball guiding groove 131 forms the bowl-shaped recessed portion. Accordingly, the cam ball 133 surely pushes the pushing body 123 and the pushing body 123 surely pushes both discs 115, 119. Accordingly, compared to the conventional constitution in which rotation-side cam ball guiding grooves are formed in a tear-drop-like recessed shape, the high forming accuracy of the rotation-side cam ball guiding groove 131 or the high assembling accuracy of the pushing body 123 is not requested and hence, the manufacturing cost can be reduced.

Further, the cam ball 133 is configured, while the movement thereof on the tapered surface 134 is restricted by the restriction portion 148 of the rotation-side cam ball guiding groove 131, to be guided and moved in the direction which narrows the distance between the tapered surface 134 and the tapered surface 135 of the fixed-side cam ball guiding groove 132. Accordingly, it is possible to ensure a large moving amount of the pushing body 123 in the thrust direction with respect to a rotation angle of the pushing body 123 and hence, it is possible to hold a stroke of the brake pedal which determines the rotation angle of the pushing body 123 in a proper amount.

Further, since the inclination angle α1 of the tapered surface 135 of the fixed-side cam ball guiding groove 132 is set larger than the inclination angle α2 of the tapered surface 134 of the rotation-side cam ball guiding groove 131, it is possible to ensure a further larger moving amount of the pushing body 123 in the thrust direction with respect to the rotation angle of the pushing body 123.

Further, the above-mentioned restriction portion 148 is arranged at a position inside than the outer peripheral portion 149 of the tapered surface 135 of the fixed-side cam ball guiding groove 132. Accordingly, it is possible to surely bring the cam ball which is restricted by the restriction portion into pressure contact with the tapered surface of the fixed-side cam ball guiding groove 132 and hence, it is possible to ensure a favorable wedge effect.

As a result, the pushing body is moved in the thrust direction and it is possible to ensure a favorable brake control effect which is generated when the pushing body pushes both discs.

Further, it is unnecessary to compensate for the shortage of a braking force by increasing the number of the rotation-side discs 115 and the fixed-side discs 119 and hence, it is possible to hold an arranging space of the brake device 114 in a compact manner.

Further, as shown in FIG. 10, while a spring receiving member 136 is formed on an inner peripheral surface of the pushing body support shaft 124 of the pushing body 123, a stepped small-diameter portion 137 is formed on a distal end of the output shaft 110, a thrust bearing 138 which constitutes a rotational-force non-transmitting means is mounted on an outer peripheral surface of the stepped small-diameter portion 137, and a compression spring 139 which constitutes a resilient means is interposed between a side surface of the thrust bearing 138 and the above-mentioned spring receiving member 136.

In this manner, with the use of the compression spring 139, the pushing body 123 is resiliently biased in the direction opposite to the thrust direction in which the rotation-side disc 115 and the fixed-side disc 119 are pushed and, at the same time, with the use of the thrust bearing 138 which is interposed between the compression spring 139 and the output shaft 110, the rotational force is prevented from being transmitted from the output shaft 110 to the compression spring 139.

In this manner, the transmission of the rotational force from the output shaft 110 to the compression spring 139 is prevented with the use of the thrust bearing 138 and hence, there is no possibility that the compression spring 139 is rotated.

As a result, in the spring receiving member 136 which constitutes a contact portion between the compression spring 139 and the pushing body 123, it is possible to prevent the generation of heat by friction and hence, it is possible to ensure a favorable brake performance.

Further, as shown in FIG. 9 and FIG. 12, a lower communication passage 140 which extends in the vertical direction and is communicated with the case body 116 is formed in a lower portion of the casing body 117 and, at the same time, an upper communication passage 141 which extends in the longitudinal direction and is communicated with the case body 116 is formed in a rear portion of the casing body 117.

Further, an oil level of a lubricant which is accommodated in the rear axle case 9 is set at a position above the lower communication passage 140 and at a position below the upper communication passage 141. Due to such a constitution, in FIG. 9 and in a side view thereof shown in FIG. 12, when the rotation-side disc 115 is rotated integrally with the output shaft 110 which is rotated in the rotation direction "a" which is the rotation in the clockwise direction, the lubricant which flows into the inside of the casing body 117 in the flow in direction "b" through the lower communication passage 140 is scraped by the rotating rotation-side disc 115, the scraped lubricant is made to flow out in the flow-out direction "c" through the upper communication passage 141, and the lubricant returns to the inside of the case body 116.

In this manner, by splashing the lubricant oil to the rotation-side disc 115 and the fixed-side disc 119, a frictional heat which is generated between both discs 115, 119 is cooled and hence, it is possible to allow both discs 115, 119 to ensure the favorable brake control function.

INDUSTRIAL APPLICABILITY

The tractor according to the present invention is applicable to the structure in which the front axle casings which extend in the lateral direction are mounted on the machine body frame and, the pair of left and right front wheels are mounted on the left-and-right-side end portions of the front axle case by way of the left and right gear casings.

What is claimed is:

1. A tractor, comprising:
   a front axle case which extends in the lateral direction and is mounted on a body frame,
   a pair of left and right front wheels respectively mounted on left and right end portions of the front axle case by way of left and right gear casings,
   the front axle case being constituted of a center casing forming body and left and right casing forming bodies which have respective proximal end portions thereof connected to left and right end portions of the center casing forming body,
   proximal end portions of the left and right casing forming bodies having mounting positions thereof which are arranged to be adjustable about axes with respect to the left and right end portions of the center casing forming body, and
   cylinder stays being mounted on the left and right casing forming bodies, respectively, and a power steering cylinder is interposed between both cylinder stays,
   left and right end portions of the power steering cylinder being respectively, interlockingly connected with left and right gear casings thereof which are connected, respectively, to distal end portions of the left and right casing forming bodies by knuckle arms,
   the left and right gear casings being constituted of fixed-side casing forming bodies and rotation-side casing forming bodies, in which the fixed-side casing forming bodies are connected to the distal end portions of the left and right casing forming bodies, and proximal end portions of the knuckle arms are rotatably and pivotally connected to upper end portions of the fixed-side casing forming bodies, distal end portions of connecting members of the knuckle arms being connected to upper end portions of the rotation-side casing forming bodies, and lower end portions of the fixed-side casing forming bodies and lower end portions of the rotation-side casing forming bodies are pivotally connected with each other, and
   rotation restricting members are mounted on outer peripheral surfaces of the fixed-side casing forming bodies so that the rotation restricting members project toward the rotation-side casing forming bodies, and driven rotation restricting members are mounted on the connecting members of the knuckle arms so that the driven rotation restricting members project toward the fixed-side casing forming bodies, the driven rotation restricting members being integrally rotated with the knuckle arms and with the rotation-side casing forming bodies and engageable with the rotation restricting members to restrict rotation of the rotation-side casing forming bodies.

2. A tractor according to claim 1, wherein the rotation restricting members are mounted on center portions of outer peripheral surfaces of the fixed-side casing forming bodies.

* * * * *